July 15, 1947. E. K. SCOGGIN Re. 22,898
STOKER CONTROL
Original Filed Feb. 24, 1936 2 Sheets-Sheet 1
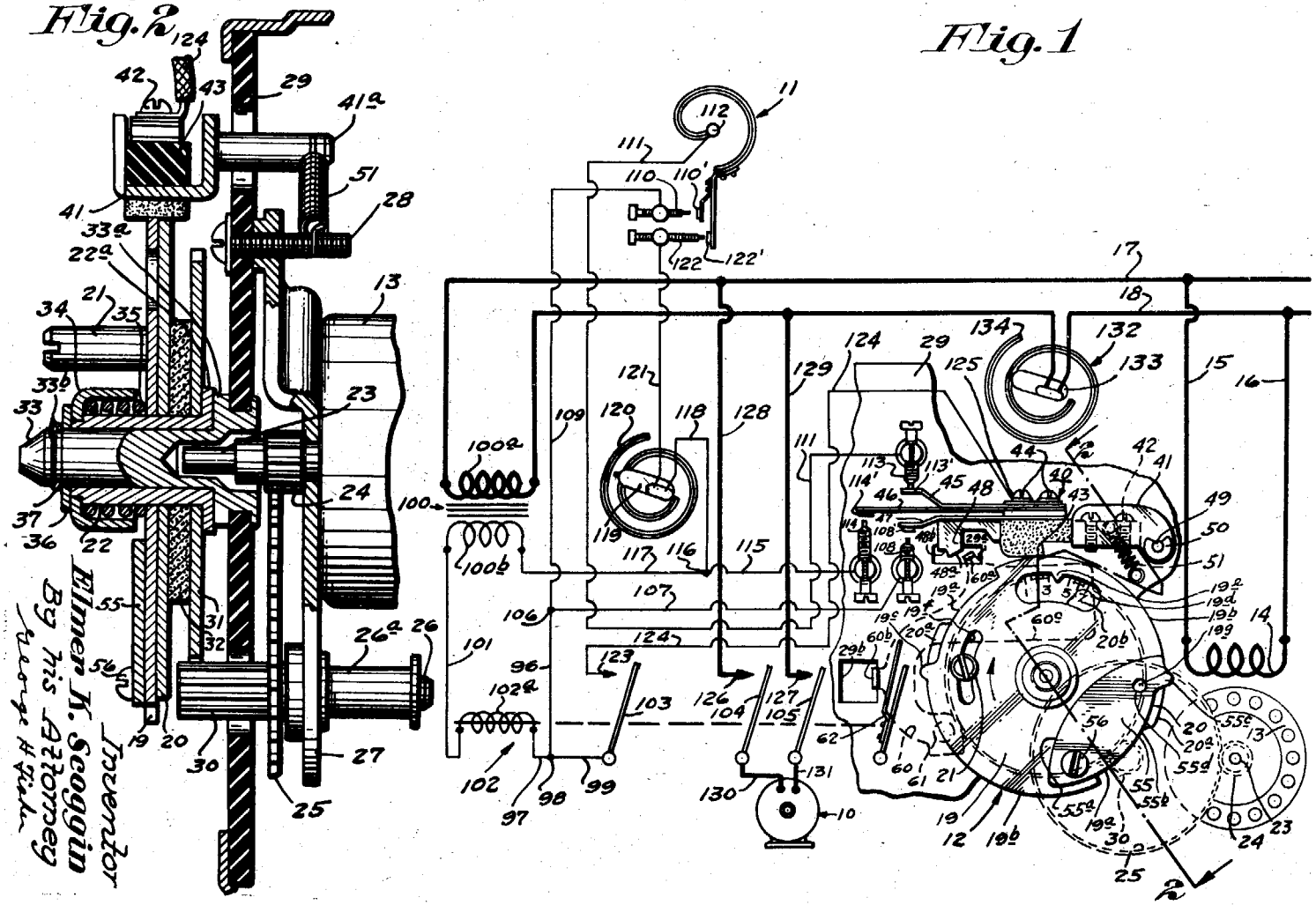

July 15, 1947. E. K. SCOGGIN Re. 22,898

STOKER CONTROL

Original Filed Feb. 24, 1936 2 Sheets-Sheet 2

Inventor
Elmer K. Scoggin
By his Attorney
George H. Fisher

Reissued July 15, 1947

Re. 22,898

UNITED STATES PATENT OFFICE 22,898

STOKER CONTROL

Elmer K. Scoggin, Golden Valley, Minn., assignor to Minneapolis Regulator Company, Minneapolis, Minn., a corporation of Delaware Original No. 2,234,388, dated March 11, 1941, Serial No. 65,226, February 24, 1936. Application for reissue December 1, 1941, Serial No. 421,252

33 Claims. (Cl. 236—46)

This invention relates to controls, and more particularly to a type of control adapted to regulate feeding of fuel to a fire under predetermined temperature conditions and/or at predetermined time intervals.

One object of this invention is the provision of an improved control system arranged to operate a mechanism, such as an automatic stoker, upon a predetermined fall in temperature to control the said temperature in a space to be heated, or at predetermined time intervals in the absence of such a temperature drop, in order to maintain combustion of the fire at all times.

Another object is the provision of a system which will automatically preclude the operation of a stoker under the control of a timed mechanism during, and for an appreciable interval after, operation of the stoker by a temperature responsive mechanism, such as a conventional thermostat.

A further object is the provision of a system wherein continued operation of a stoker by temperature controlled means after energization by timed mechanism is precluded in the absence of a call for heat in the space to be heated.

Still another object is the provision of improved mechanism for controlling intermittent timed feeding of fuel to a source of combustion.

A further object is the provision of suitable mechanism to vary the duration of a period during which fuel is fed to a fire under the control of timed mechanism.

A still further object is the provision of means to vary the interval between the timed operations of a timed fuel feeding control mechanism.

A more specific object is the provision of improved mechanism to accomplish the above and other objects, which will be durable in construction and reliable in operation.

A further specific object is the provision in a system including a thermostat and a timer mechanism, of an auxiliary temperature responsive circuit controlling mechanism in the thermostat circuit.

Other objects will in part be obvious and in part be pointed out hereinafter.

Accordingly, the invention consists in the arrangements of parts, combinations of elements and features of construction, as will be exemplified in the structure to be hereinafter described, and the scope of the application of which will be indicated in the following claims.

In the accompanying drawings, wherein is shown one of the various possible embodiments of this invention:

Figure 1 is a schematic view showing certain parts of the structure of the instant invention and a diagrammatic representation of one form of control circuit;

Figure 2 is an enlarged sectional elevation taken substantially along line 2—2 of Figure 1;

Similar reference characters refer to similar parts throughout the several views of the drawings.

Figure 3:
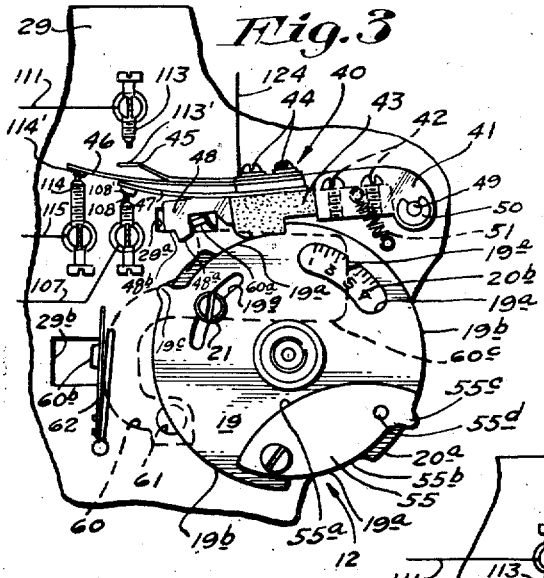
Figures 3, 4 and 5 are detailed views of certain portions of the structure shown in Figure 1, showing certain movable parts in different positions.

Referring now to the drawings and more particularly to Figure 1: a suitable motor, generally indicated at 10, which may serve to drive any suitable apparatus such, for example, as an automatic stoker (not shown), to feed fuel to a furnace, is controlled, in a manner to be hereinafter described, by the conjoint action of a suitable thermostat, schematically indicated at 11, and a timer mechanism, generally indicated at 12. Timer mechanism 12 is so constructed and arranged as to operate motor 10 for a predetermined period at suitable intervals, such as, illustratively, four minutes every half hour, such periods and intervals being subject to variation at the will of the operator. Provision is also made to render timer mechanism 12 ineffective when motor 10 is in operation under the control of thermostat 11 during the normal operating period of timer mechanism 12 and for a suitable period subsequent to the cessation of such operation. One system and arrangement of parts adapted to accomplish the above and other results will now be described.

Timer mechanism 12 includes a suitable motor 13 which may be of the synchronous type, having a field winding 14 to which current is supplied through lead wires 15 and 16 from suitable line wires 17 and 18, which in turn lead to a suitable source of electrical energy (not shown). A pair of cams 19 and 20 are coaxially mounted, in a manner to be hereinafter described, on a sleeve 22 and rotated in a counter-clockwise direction as indicated by the arrow in Figure 1, through suitable gearing and friction mechanism, also to be described hereinafter, by motor 13. Cam 19 is preferably constructed in such a manner as to have two oppositely disposed low surfaces 19a with intervening high surfaces 19b. A suitable projection 19c is also formed on the face of cam 19. An elongated aperture 19d having a projection in the form of a pointer 19e on its inner periphery, is cut into cam 19, and a slot 19f is also cut through cam 19 at a point spaced away from aperture 19d.

Cam 20 has two oppositely spaced high surfaces 20a of a peripheral extent slightly less than the peripheral extent of low surfaces 19a. Suitable indicia 20b may be suitably affixed to or imprinted on a portion of the surface of cam 20. A stud 21 having a threaded end is provided for engagement with a suitable aperture in cam 20.

By reference to Figures 1 and 2 of the drawings, it will be seen that when the parts are in assembled relation stud 21 is passed through slot 19f and threadedly engaged with cam 20, and indicia 20b is positioned below and adjacent aperture 19d in alignment with pointer 19e. By loosening stud 21 cam 20 may be rotated about sleeve 22 with respect to cam 19 and the composite high surface area of cams 19 and 20, which includes the total of the high surface areas 19b and 20a, may be varied. Indicia 20b will be correspondingly varied with respect to pointer 19e and accordingly may indicate, in the form of time indications, as will be explained hereinafter, the combined low surface area of cams 19 and 20.

Having particular reference to Figure 2, it will be seen that motor 13 has a drive shaft 23 to which is affixed a suitable pinion 24 which engages a reduction gear 25. Pinion 24 is driven through a suitable conventional reduction train (not shown). Gear 25 has an axle 26 journaled for rotation in a sleeve 26a secured to a mounting bracket 27. Mounting bracket 27 may be secured in any suitable manner, as by screws 28, to an insulating panel 29 which may comprise a portion of a suitable casing (not shown). Axle 26 carries at one end a second reduction gear 30 which engages a driven gear 31 which is mounted on sleeve 22. Gear 31 may have a diameter substantially equal to that of gear 25 in order that sleeve 22 and shaft 23 may be in substantial alignment. A suitable friction disc 32, which may be of any desired material but for which, in practice, cork has been found advantageous, is mounted on sleeve 22 adjacent gear 31. Cams 20 and 19 respectively are then superimposed on disc 32. A stud member 33, suitably mounted in panel 29, passes through the interior of sleeve 22 and serves as an axle for rotation of sleeve 22 thereabout. Sleeve 22 has a flanged annulus 22a for abutment with a rim 33a of stud 33. A housing 34 holds a spring 35, positioned about the exterior periphery of sleeve 22, in close juxtaposition with the exterior face of cam 19. A washer 36 may be superimposed over the outer end of housing 34 and held in place by the coaction of a spring collar 37 with a suitable groove 33b adjacent the outer end of axle 33.

It will now be seen that rotation of shaft 23 is imparted to cams 19 and 20 through sleeve 22 and the chain of reduction gears 24, 25, 30 and 31. In practice it has been found desirable to arrange the gearing ratio in such manner that cams 19 and 20 make one complete rotation every hour.

It will further be seen that friction disc 32 provides means whereby cams 19 and 20 may be rotated with respect to sleeve 22 for any desired purpose, such as adjustment of the timer mechanism above described.

A cam follower assembly, generally indicated at 40, is pivotally mounted adjacent a portion of the exterior periphery of cams 19 and 20. Cam follower 40 is comprised of a block 43 of suitable insulating material on which are mounted by any suitable means, such as screws 44, a plurality, illustratively three, of spring contact arms 45, 46 and 47, the purpose of which will be described hereinafter.

It will now be seen that the cam assembly comprised of cams 19 and 20 rotates adjacent cam follower 40 and presents thereto at spaced intervals a low surface 19a of cam 19. The area of surface 19a is determined by the relative position of an adjacent high surface 20a of cam 20. Variation of the position of high surface 20a with respect to low surface 19a correspondingly varies the position of indicia 20b with respect to pointer 19e. Since the cam assembly rotates once an hour each low surface 19a, except under circumstances to be hereinafter described, is juxtaposed to cam follower 40 for a period of minutes during each hour. Indicia 20b, therefore, may be calibrated to designate minutes and the position of pointer 19e with respect thereto accordingly indicates the number of minutes during each hour that each of low surfaces 19a is juxtaposed to cam follower 40.

The mounting of cam follower 40 may comprise a mounting member 41 to which block 43 may be secured by any suitable means, such as screws 42. Mounting member 41 may be pivotally mounted on panel 29 through pivot 49, and secured, as by a spring collar 50. A spring 51 secured to an arm 41a extending from mounting member 41, and a fixed point on panel 29, such as screw 28, (see Figure 2), is so designed and positioned as normally to hold block 43 adjacent the periphery of cams 19 and 20. A downwardly depending lug 48 having a cam surface 48a and a latching surface 48b, for a purpose to be hereinafter described, is also affixed to mounting member 41 and may comprise an integral part thereof.

It will now be seen that the timed rotation of cams 19 and 20 causes cam follower 40 to drop a distance equal to the difference between high surface 19b and low surface 19a, due to the combined force of gravity and spring 51 each time a low surface area of the cam assembly rotates into engagement with block 43, and that cam follower 40 is held in a raised position for the period during which the high surface 19b of cam 19 is adjacent thereto. The fall of cam follower 40 to its low position causes the closure of a circuit in a manner and for a purpose to be hereinafter described, while a subsequent rise of cam follower 40 by juxtaposition to high surface 19b of cam 19 causes the circuit to re-open.

Figure 7:
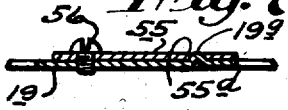
Figure 7 is a sectional view taken along line 7—7 of Figure 6.

While in the preceding discussion cam 19 has been pointed out as having a pair of oppositely disposed low surfaces in order to permit a drop of cam follower 40 at every half rotation of cam 19 by motor 14, provision is made whereby such a drop may occur only once during every full rotation of cam 19. The mechanism for accomplishing this comprises a segment 55, one surface 55a of which is comprised of an arc having a radius of curvature substantially equal to high surface 19b of cam 19, and the other surface 55b of which is comprised of an arc having a radius of curvature equal to low surface 19a of cam 19. A projection 55c formed on surface 55b is substantially equal in contour and dimensions to projection 19c on cam 19. A securing screw 56 passing through an aperture in segment 55 may engage a suitable threaded opening in cam 19 to hold segment 55 in related assembly with cam 19. Additional securing means to prevent rotation of segment 55 about screw 56 may be provided in the form of an aperture 55d in member 55 and a suitable projection 19g on the surface of cam 19 adapted to engage therewith (see Figure 7).

Figure 5:
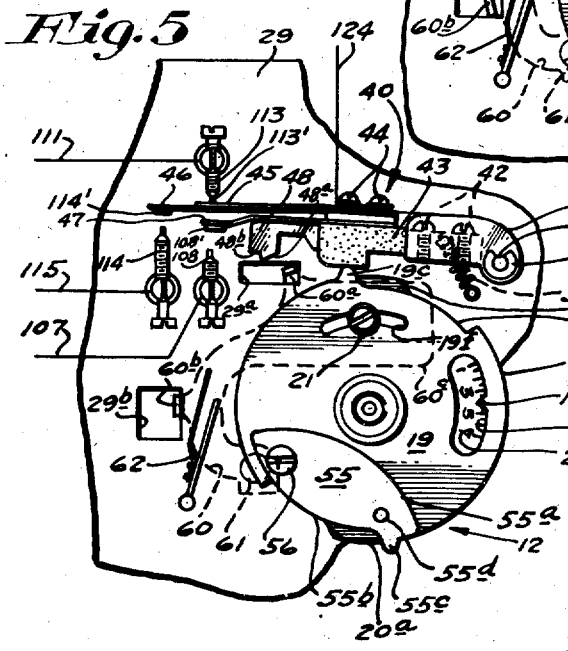
Figure 6:
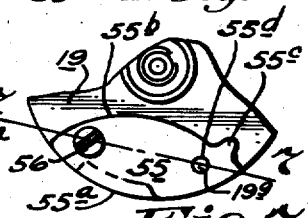
Figure 6 is a detailed view showing another portion of the structure in a different position.

From the above it will be seen that the portion of the peripheral configuration of the cam assembly adjacent segment 55 may be varied by a simple reversal of segment 55 to the position shown in Figure 6 by release of screw 56. It will also be seen that when segment 55 is in the position shown in Figures 1, 3, 4 and 5 of the drawings both low surfaces 19a of cam 19 will be juxtaposed to cam follower 40, but that when the position of segment 55 is reversed, as in Figure 6, that portion of the cam assembly adjacent segment 55 will present an unbroken high surface area. Accordingly, when segment 55 is in the position shown in Figures 1, 3, 4 and 5 of the drawings cam follower 40 will drop twice during each full, or illustratively, hourly, rotation of the cam assembly comprising cams 19 and 20 and segment 55, to close a circuit and actuate stoker motor 10, as will be hereinafter set forth. But when segment 55 is reversed in the position shown in Figure 6, such actuation will occur only once during each hour.

As shown in Figures 1, 3, 4 and 5, in dotted lines a lever 60 is pivotally mounted as by means of a pivot 61 on, and to the rear of, operating panel 29. A projection 60a extends forwardly from lever 60 through a suitable aperture 29a in panel 29 immediately adjacent lug 48, and a second projection 60b extends from lever 60 through an aperture 29b at a second point spaced from aperture 29a. Projections 60a and 60b are adapted to be moved in a manner and for a purpose set forth hereinafter, and apertures 29a and 29b serve not only to permit passage of projections 60a and 60b through panel 29, but also as stops to limit the movement thereof. A suitable extension, which comprises a weight 60c, extends beyond pivot point 61 of lever 60 and serves normally to hold lever 60 at the extreme limit of pivotal rotation in a clockwise direction, such limit, as above stated, being defined by engagement of projection 29a and 29b with the right hand (as seen in the drawings) walls of their associated apertures 60a and 60b respectively. A pivoted spring arm 62 is mounted adjacent projection 60b and is adapted to be actuated in a manner to be hereinafter described toward and away from projection 60b.

The fall of insulating block 43 upon engagement with low surface 19a of the cam assembly, as above stated, closes a circuit in a manner hereinafter described, which serves to draw arm 62 to the left as viewed in the drawings. Likewise, the closing of a circuit by thermostat 11 in a manner to be described hereinafter also draws spring arm 62 to the left as shown in Figure 1.

Referring now particularly to Figure 3, insulating block 43 is shown in engagement with the low surface 19a of cam 19. The circuit is now closed by means of cam follower 40 and spring arm 62 is shown as bearing to the left against projection 60b of lever 60. The pressure of spring arm 62 overcomes the gravitational pull of weight 60c and causes projection 60a to abut the inner surface of lug 48. Upon continued rotation of the cam assembly engagement of high surface 19b with insulating block 43 will cause cam follower 40 to rise and break the circuit, which will in turn release the pressure of arm 60 against projection 60b and permit the parts, with the exception of the continuously rotating cam assembly, to return to the position as shown in Figure 1.

Figure 4:
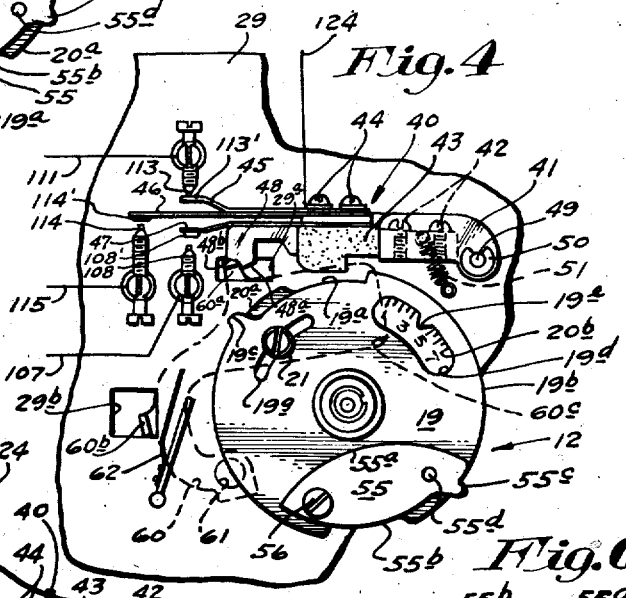

Should spring arm 62, however, be actuated by thermostat 11 while insulating block 43 is in engagement with a high surface portion 19b of cam 19, spring arm 62 will engage projection 60b and force projection 60a into engagement with cam surface 48a and therealong into engagement with latching surface 48b. Upon release of the pressure of arm 62 the parts will remain in the position as indicated in Figure 4, with projection 60a engaging latching surface 48b even after low surface 19a has rotated to a position adjacent insulating block 43, until continued rotation brings the parts into the position shown in Figure 5, whereupon projection 19c raises insulating block 43 and hence cam follower 40 to a height sufficient to release projection 60a from engagement with latching surface 48b of lug 48. Thereupon weight 60c turns lever 60 about its pivot 61 until projection 60a again abuts the righthand wall of aperture 29a.

It is to be noted that projection 19c is adjacent an end of low surface 19a in a direction counter to the direction of rotation of the cam assembly. Accordingly, it will be seen that if cam follower 40 and lug 48 are in such position as shown in Figure 4 as to necessitate release from engagement with projection 60a by action of projection 19c, it will be impossible to close the circuit associated with cam follower 40 for a definite period, subsequent to the release of projection 60a from engagement with latch member 48b. This period is of a duration sufficient to permit an entire high surface 19b to pass cam follower 40 before the presentation of a low surface 19a to permit cam follower 40 to drop.

It may here be pointed out that with the parts, including segment 55, in the position as shown in Figures 1, 3, 4 and 5 of the drawings, projection 55c serves the same purpose and acts in the same manner as projection 19c.

Having particular reference to the wiring diagram shown in connection with Figure 1, line wires 17 and 18 lead through the primary 100a of a suitable step-down transformer 100. A wire 101 leads from one side of the secondary 100b of transformer 100 to a coil 102a of a relay, generally indicated at 102. Relay 102 includes contact arms 103, 104, 105 and is also operably associated with spring arm 62. In practical form spring arm 62 may comprise an extension of one of the arms 103, 104 or 105 of relay 102. A wire 97 leads from the side of relay coil 102a opposite wire 101 to a junction 98 from which a wire 99 leads to arm 103. A wire 96 leads from junction 98 to a junction 106 from which extends a wire 107 to a contact 108 which is adapted to engage opposite contact 108' carried by spring arm 47 of cam follower 40. A second wire 109 also leads from junction 106 to a contact 110 adapted to engage an associated contact 110' carried by bimetallic thermostat 11. A wire 111 leads from terminal 112 of thermostat 11 to a contact 113 which is adapted to engage an opposed contact 113' carried by spring arm 45 of cam follower 40. The arm 46 of cam follower 40 bears a contact 114' at an end thereof, adapted to engage a contact 114. A wire 115 leads from contact 114 to a junction 116, from which a wire 117 leads to transformer secondary 100b at the side opposite wire 101. A second wire 118 leads from junction 116 to a mercury switch 119 associated with a thermostatic element 120 for a purpose to be more fully described hereinafter, and a second wire 121 leads from mercury switch 119 to a contact 122 positioned adjacent a corresponding contact 122′ carried by a movable arm of thermostat 11.

Arm 103 of relay 102 is adapted under circumstances to be hereinafter described, to engage a contact 123. A wire 124 leads from contact 123 to a terminal 125 carried by cam follower 40. Terminal 125 may, in practice, comprise one of holding screws 44, provided electrical contact is established therethrough with arms 45, 46 and 47 and hence contacts 113′, 114′ and 108′. Arms 104 and 105 are adapted to engage respectively contacts 126 and 127 which in turn are connected with wires 128 and 129 respectively, leading from line wires 17 and 18. The opposite ends of arms 104 and 105 are connected through wires 130 and 131 respectively to motor 10. Accordingly, it will be seen that energization of relay 102 in a manner to be explained hereinafter, will cause arms 104 and 105 to engage contacts 126 and 127 respectively and operate motor 10 directly from line wires 17 and 18.

Assuming now that the parts are in the position shown in Figure 1, it will be seen that no circuit is closed through relay coil 102*a* and in consequence arms 103, 104 and 105 are open and spring arm 62 exerts no pressure on projection 60*b*.

Now, having particular reference to the circuit controlled by timer mechanism 12, assume that the cam assembly comprised of cams 19 and 20 has rotated to the position shown in Figure 3. Insulating block 43 will drop, permitting contacts 114′ and 108′ to engage respectively contacts 114 and 108. An energizing circuit is now established from transformer secondary 100*b* through wire 101, relay coil 102*a*, wire 97, junction 98, wires 96 and 107, contacts 108—108′, arms 47 and 46, contacts 114′—114, wire 115, junction 116, and wire 117 back to transformer secondary 100*b*, which serves to energize relay 102. Arm 103 is now pulled inwardly to engage contact 123, whereupon a holding circuit is established from transformer secondary 100*b* through wire 101, relay coil 102*a*, wire 97, junction 98 as above described, and thence through wire 99, arm 103, contact 123, wire 124, terminal 125, arm 46, contact 114′ to contact 114—114′, wire 115, junction 116 and wire 117 to transformer secondary 100*b*, wires 96 and 107 and contact 108, 108′ being shunted out. Simultaneously, with the closing of arm 103, arms 104 and 105 engage contacts 126 and 127 and stoker motor 10 is placed in operation. Likewise, simultaneously spring arm 62 bears against projection 59*b* and forces projection 60*a* into engagement with the right-hand surface of lug 48, as shown in Figure 3. Upon further rotation of the cam assembly a high surface 19*b* raises insulating block 43 and breaks, first, contacts 108—108′ and in a relatively short time thereafter contacts 114—114′. It will be seen from the description of the circuit above given that motor 10 continues to operate until contacts 114—114′ are broken and in the absence of any activity on the part of thermostat 11, still assuming it to be in the open position shown in Figure 1, the circuit through relay coil 102*a* is broken to permit arms 103, 104 and 105 to move away from their respective contacts and likewise to permit spring arm 62 to release its pressure on projection 60*b*. In the continued absence of activity on the part of thermostat 11 this cycle will be continued at hourly or half-hourly intervals, depending upon the position of segment 55, and such actuation of motor 10 will be for a period to be determined by the relationship of cams 19 and 20 with respect to each other.

Assume now, with reference to the circuit controlled by thermostat 11, the parts, including the timer mechanism 12, being in the position shown in Figure 1, that there is a call for heat in the space, the temperature of which is adapted to be controlled by thermostat 11. Contacts 122—122′ close and after an interval and upon a further drop in temperature contacts 110—110′ close. The purpose of this plurality of contacts will be described hereinafter. A circuit is now established through contact 122, wire 121, mercury switch 119, assuming switch 119 is closed, which it will be except under certain conditions to be hereinafter set forth, wire 118, wire 117, transformer secondary 100*b*, wire 101, relay coil 102*a*, wires 97, 96 and 109, contacts 110—110′, thermostat 11 and contact 122′. This circuit serves also to energize relay coil 102*a* and close its associated contacts to establish a holding circuit from transformer 100 through wire 101, relay coil 102*a*, wire 97, junction 98, wire 99, arm 103, contact 123, wire 124, terminal 125, arm 45, contacts 113—113′, wire 111, terminal 112, thermostat 11, contacts 122—122′, wire 121, mercury switch 119, wire 118, junction 116, wire 117 back to transformer secondary 100*b*. Contacts 110—110′ and wires 109, 106 and 96 are shunted out. Spring arm 62 is likewise actuated causing projection 60*a* to be pulled into latching engagement with latching surface 48*b* of lug 48. Simultaneously stoker motor 10 is put in operation. It will now be seen that upon continued rotation of cam 19 to the position as shown in Figure 4, wherein it presents a low surface 19*a* to cam follower 40, projection 60*a* serves to hold cam follower 40 through latching surface 48*b* in the same position as though it engaged a high surface, and accordingly will not permit closing of the circuit through contacts 114—114′, and 108—108′ as previously discussed.

If, however, during the time low surface area 19*a* is adjacent cam follower 40 and the requirement for heat in the space to be heated has been satisfied, relay 102 is deenergized and pressure on the spring arm 62 correspondingly released, whereupon the engagement of projection 19*c* or projection 55*c*, as the case may be, with insulating block 43 will serve to lift lug 48 out of latching engagement with projection 60*a* and permit the same to return to the position shown in Figures 1 and 5 under the impetus of weight 60*c*. The system is now in condition for operation by the timer mechanism upon the next presentation of a low surface 19*a* to cam follower 40.

If, however, during the period immediately following release by one of the projections 19*c* or 55*c*, thermostat 11 again responds to a call for heat and closes the circuit through relay 102, projection 60*a* will again engage latching member 48*b* and the cycle will be repeated.

Accordingly, it will be seen that under such circumstances as abnormally cold weather when the room thermostat makes frequent and/or prolonged calls for heat, the timer mechanism may rotate for an indefinite period without actuating the stoker, but that under other conditions, such as an unusually warm spell of weather, the timer mechanism will serve to maintain a fire in the furnace even though no demand for heat whatsoever is made by thermostat 11. It will further be seen that the timer mechanism is rendered incapable of operating the stoker during actuation by the thermostat 11 and for a period subsequent thereto. Such a period may vary from, at a minimum, approximately a half an hour, assuming that thermostat 11 satisfies the call for heat in the space to be heated immediately prior to the passage of a projection 19c or 55c past cam follower 40, to a period of nearly two hours, assuming that cam segment 55 is in its reversed position as shown in Figure 6 and that the thermostat satisfies the call for heat in the space to be heated immediately subsequent to the passage of projection 19c past cam follower 40.

Referring back to thermostat 11, it has been found desirable to arrange the contacts 110′ and 122′ in such manner that they will engage their opposite contacts 110 and 122 respectively at different temperatures, as for example, contact 122—122′ may make at 72° and contact 110—110′ at 70°. This temperature may of course be adjusted to the individual heating requirements of the space to be heated. Assume that the temperature falls below 70°. Both contacts 110—110′ and 122—122′ make to close the energizing circuit above described and energize relay 102. Upon such energization arm 103 will engage contact 123. The maintaining circuit above described is now established and stoker motor 10 continues to operate. Now assume the temperature rises to 71°. Contact 110—110′ is broken but stoker motor 10 continues to operate since relay 102 is closed through the maintaining circuit above described. Upon a temperature rise above 72°, however, contacts 122—122′ break, relay 102 is deenergized, and stoker motor 10 ceases to operate. Now assume that the temperature falls from 72° to 71°. Contact 122—122′ makes but stoker motor 10 is not started since no circuit is established. However, if the timer mechanism 12 at this point energizes relay 102 through the closing of contacts 114—114′ and contacts 108—108′ and actuates the stoker motor 10 for the predetermined period, it will be seen that contact 113—113′ is open and that at the end of the time period the circuit is broken by the opening of contacts 114—114′ and 108—108′ prior to the making contact 113—113′.

The inclusion of contact 113—113′ in the circuit thus serves to maintain the temperature of the space to be heated within the normal range of thermostat 11 since, in the absence of such circuit breaking means, and assuming contact 123 to be directly connected to wire 111, if relay 102 and motor 10 were energized by timer mechanism 12 with the room temperature at 71° and therefore with contacts 110′—110 and 122′—122 open and closed respectively, stoker motor 10 would continue to operate through a holding circuit comprising transformer secondary 100b, wire 101, relay coil 102a, wires 97 and 99, arm 103, contact 123, wire 111, terminal 112, thermostat 11, contact 122—122′, wire 121, switch 119 and wires 118 and 117, after the termination of the timed period until the temperature reached 72° to break contact 122—122′.

The room temperature may, therefore, through the operation of contact 113—113′ above described, be maintained constantly within the normal predetermined differential of the thermostat as, in the illustrative example above given, between 70° and 72°.

It will now be seen that the provision of contact 113—113′ serves to preclude actuation of stoker motor 10 by thermostat 11 while timer mechanism 12 is in control, and further that no circuit originally energized by timer mechanism 12 may be held through thermostat 11 after the termination of a timed operating period in the absence of a call for heat serving to close both contacts 110—110′ and 122—122′.

In some instances, however, it may be desirable that the temperature be maintained constantly above the normal differential of thermostat 11 or above the making point of contacts 110—110′, as in the illustration above, 72°. In this case contact 113—113′ and its associated arm 45 and wiring may be omitted and wire 111 connected directly to contact 123. Then, in the event of a temperature fall to 71° and consequent making of contact 122—122′, contact 110—110′ remaining open, if the stoker is started and relay 102 energized by the above described action of timer mechanism 12, upon the termination of the timed period of operation, stoker motor 10 will continue in operation through a holding circuit comprising transformer 100, wire 101, relay 102, wires 97 and 99, arm 103, contact 123, wire 111, terminal 112, thermostat 11, wire 121, mercury switch 119 and wires 118 and 117 back to transformer 100, until the temperature reaches 72° and contact 122—122′ breaks. It will accordingly be seen that while contact 113 and its associated wiring forms a desirable adjunct to the system as a whole, it may be omitted if the operation above described is desired.

Referring now to thermostatic element 120 associated with mercury switch 119, it has been found desirable in many instances to position a suitable high limit control adjacent, say, the water boiler of a heating system in order to preclude an unnecessary rise in the temperature of water during such a transition period as, for example, from a night temperature of approximately 60° to a day temperature of approximately 70°. It has been found that during such transition period in the absence of such a control as indicated diagrammatically by thermo-responsive element 120 and mercury switch 119, the temperature of the water in the boiler may rise to an unnecessarily high degree due to the prolonged action of the stoker in raising the temperature to normal day heat. Such a high limit control suitably interposed in the thermostat circuit serves to cut off the stoker for sufficient periods to permit cooling of the water to normal operating temperatures even though the position of thermostat 11 still indicates a low temperature in the space to be heated. This high limit control serves, therefore, to retard continuous action of the stoker in such a manner as to prevent unnecessary overheating of the boiler.

The inclusion of the above described control is particularly advantageous in mild climates where the temperature increases very rapidly with the rise of the sun. During the night the temperature may be relatively low and when thermostat 11 first calls for heat in the morning a relatively long energization of the stoker motor is required to furnish the requisite heat. The boiler temperature accordingly rises rapidly, whereas the actual temperature requirement may be partially satisfied by the rise in outdoor temperature, caused by the sun. In the absence of such a limit control as above described, the boiler temperature would rise due to the aforementioned demand for heat, to a point sufficient to overheat the building and, under normal circumstances, a considerable time would elapse before the temperature could cool to the desired level. The inclusion of the limit control therefore serves primarily to preclude too rapid a rise in boiler temperature in order to compensate for a relatively rapid rise in outdoor temperature, and prevents overheating of the space to be heated due to the combined effects of the outdoor temperature and heating system.

A second high limit control generally indicated at 132, which may comprise a suitable stack switch, diagrammatically indicated by mercury switch 133 and thermostatic element 134, is interposed in the line circuit in order to provide an absolute cu-off should the temperature in the stack of the furnace, or, in other words, the combustion temperature, reach a point of danger.

It may here be pointed out that in the preferred embodiment of the invention motor 13 is connected through wires 15 and 16 to line wires 17 and 18 between the high limit control 132 and the source of power supply, in order that the timed rotation of the cam assembly may be unaffected by the opening of mercury switch 133.

From the foregoing it will be seen that there is herein provided a system and a specific structure which embody the features of this invention and achieve the objects thereof including advantages of great practical importance.

As many possible embodiments may be made of the above invention anad as many changes might be made in the embodiment above set forth, it is to be understood that all matter hereinbefore set forth or shown in the accompanying drawings is to be interpreted as illustrative and not in a limiting sense.

I claim as my invention:

1. In a control system, in combination, a circuit, condition responsive means to open and close said circuit, additional means to open and close said circuit at predetermined time intervals, and a mechanical latch means movable by said condition responsive means to latching position to maintain said additional means in open position during the period when said condition responsive means closes said circuit and for an appreciable period subsequent to the opening thereof by said condition responsive means.

2. A circuit controlling mechanism, comprising, in combination, a relay, temperature responsive means to open and close a circuit through said relay, time controlled means to open and close a circuit through said relay, and means to preclude closing of said time controlled circuit during the period when said circuit is closed by said temperature responsive means and immediately subsequent to reopening thereof, said last mentioned means comprising an arm associated with said relay and adapted upon closing of said relay to engage mechanically with said time controlled means.

3. A circuit controlling mechanism, comprising, in combination, a relay, temperature responsive means to close a circuit through said relay, time controlled means to close a circuit through said relay, aand means to preclude closing of said time controlled circuit while said temperature controlled circuit is closed and for an appreciable period subsequent to opening thereof, said means comprising latch means associated with said relay and said time controlled means.

4. A circuit controlling mechanism, comprising, in combination, a relay, temperature responsive means to close a circuit through said relay, time controlled means to close a circuit through said relay, means to preclude closing of said time controlled circuit while said temperature controlled circuit is closed and for an appreciable period subsequent to opening thereof, said means comprising latch means associated with said relay and said time controlled means, and means on said time controlled means to release said latch means after the termination of said predetermined period.

5. A control system for stokers, including a plurality of circuits, closure of either of said circuits adapted to operate said stoker, condition responsive means including a switch to close one of said circuits, time controlled means including a switch to close another of said circuits, means actuated by the closure of one of said switches to maintain another of said switches open during closure of and for a variable period subsequent to reopening of said one of said switches, said means comprising mechanical latch means actuated by the closure of one of said switches to engage the other of said switches to hold the same in open position, and means actuated by said time controlled means to disengage said latch means and said other switch.

6. A device of the character described, comprising, in combination, a relay, means to energize said relay, additional means to energize said relay, said additional means including rotatable cam means having high and low surfaces and pivotally mounted cam follower means, the arrangement being such that engagement of said cam follower means with one of said surfaces upon rotation of said cam means energizes said relay, and means actuated by said first mentioned means to preclude pivotal movement of said cam follower means.

7. A device of the character described, comprising, in combination, a relay, means to energize said relay, additional means to energize said relay, said additional means including rotatable cam means having high and low surfaces and pivotally mounted cam follower means, the arrangement being such that engagement of said cam follower means with one of said surfaces upon rotation of said cam means energizes said relay, and means actuated by said first mentioned means to preclude pivotal movement of said cam follower means, said means including a latch means associated with said cam follower means.

8. A device of the character described, comprising, in combination, a relay, means to energize said relay, additional means to energize said relay, said additional means including rotatable cam means having high and low surfaces and pivotally mounted cam follower means, the arrangement being such that engagement of said cam follower means with one of said surfaces upon rotation of said cam means energizes said relay, means actuated by said first mentioned means to preclude pivotal movement of said cam follower means, said means including latch means associated with said cam follower means and means on said cam means to release said latch means.

9. A device of the character described, comprising, in combination, a relay, means to energize said relay, additional means to energize said relay, said additional means including rotatable cam means having high and low surfaces and pivotally mounted cam followed means, the arrangement being such that engagement of said cam follower means with one of said surfaces upon rotation of said cam means energizes said relay, means actuated by said first mentioned means to preclude pivotal movement of said cam follower means, said means including latch means associated with said cam follower means and means on said cam means to release said latch means, said last mentioned means including a projection extending a substantial distance above said high surface.

10. A device of the character described, comprising, in combination, a relay, means to energize said relay, additional means to energize said relay, said additional means including rotatable cam means having high and low surfaces and pivotally mounted cam follower means, the arrangement being such that engagement of said cam follower means with one of said surfaces upon rotation of said cam means energizes said relay, means actuated by said first mentioned means to preclude pivotal movement of said cam follower means, said means including latch means associated with said cam follower means, means on said cam means to release said latch means and means to return said latch means to unlatching position upon release by said means on said cam means.

11. In a control system in combination, a motor, condition responsive means to energize said motor through a circuit, time controlled means to energize said motor through another circuit, means to prevent continued energization of said motor through said first mentioned circuit after energization by said second mentioned circuit when said first mentioned circuit is not closed through said condition responsive means, said means including a switch, and means associated with said time controlled means to open said switch prior to energization of said motor through said second mentioned circuit, and close said switch subsequent to deenergization of said motor therethrough.

12. A device of the character described, comprising in combination, motor actuating means, first means to energize said actuating means, second means to energize said actuating means, said second means including a revolvable cam having a high and a low surface and a pivoted cam follower adjacent thereto the arrangement being such that engagement of said cam follower with one of said surfaces energizes said actuating means, means to rotate said cam at a predetermined speed whereby said one of said surfaces engages said cam follower at predetermined intervals and means actuated by said first means to preclude energization of said actuating means by said additional means, said last mentioned means comprising a latch member movable by said first means into latching relation with said second means.

13. In a stoker control system, in combination, condition responsive means to operate said stoker, time controlled means to operate said stoker, said time controlled means including a rotatable cam and a cam follower, said cam follower being movable into and out of stoker operating position according to the cam surface adjacent thereto, means to rotate continuously said cam at a relatively constant speed whereby said cam follower operates said stoker at predetermined intervals and mechanical means controlled by said condition responsive means for affecting said cam follower to preclude operation of said stoker by said time controlled means during, and for an appreciable period subsequent to, operation of said stoker by said condition responsive means.

14. In a stoker control system, in combination, condition responsive means to operate said stoker, time controlled means to operate said stoker said time controlled means including a rotatable cam and a cam follower, said cam follower being movable into and out of stoker operating position according to the cam surface adjacent thereto, means to rotate said cam at a relatively constant speed whereby said cam follower operates said stoker at predetermined intervals and mechanical means controlled by said condition responsive means to preclude operation of said stoker by said time controlled means during, and for an appreciable period subsequent to, operation of said stoker by said condition responsive means, said last mentioned means comprising a latch movable upon operation of said stoker by said condition responsive means to engage said time controlled means.

15. In a stoker control system, in combination, condition responsive means to operate said stoker, time controlled means to operate said stoker, said time controlled means including a rotatable cam and a cam follower, said cam follower being movable into and out of stoker operating position according to the cam surface adjacent thereto, means to rotate said cam at a relatively constant speed whereby said cam follower operates said stoker at predetermined intervals, and mechanical means controlled by said condition responsive means to preclude operation of said stoker by said time controlled means during and for an appreciable period subsequent to operation of said stoker by said condition responsive means, said last mentioned means comprising a latch movable upon operation of said stoker by said condition responsive means to engage said time controlled means, and trip means associated with said cam to release said latch means after a desired interval.

16. In a control system, a motor, a relay adapted to operate said motor, a thermostat adapted to energize said relay, time controlled mechanism also adapted to energize said relay, said mechanism comprising revolvable cam means, means to revolve said cam means at a relatively constant speed, cam follower means operated by said cam means and means operated by said cam follower means to operate said relay upon operation of said cam follower means by said cam means, and means operated by said relay to prevent operation of said cam follower means to a relay energizing position by said cam means during energization of said relay by said thermostat.

17. In a stoker control system, in combination, condition responsive means to operate said stoker, time controlled means to operate said stoker said time controlled means including a rotatable cam and a cam follower, said cam follower being movable into and out of stoker operating position according to the cam surface adjacent thereto, means to rotate said cam at a relatively constant speed whereby said cam follower operates said stoker at predetermined intervals and mechanical means controlled by said condition responsive means to preclude operation of said stoker by said time controlled means during, and for an appreciable period subsequent to, operation of said stoker by said condition responsive means, said last mentioned means comprising a latch movable upon operation of said stoker by said condition responsive means to engage the cam follower of said time controlled means, said last mentioned means comprising an arm and a lever adjacent said cam means, the arrangement being such that said arm upon movement of said relay engages said lever and through said lever holds said cam follower means.

18. A circuit controlling mechanism, comprising, in combination, a relay, a temperature responsive means to open and close a circuit through said relay, time controlled means to open and close a circuit through said relay, said time controlled means comprising, in combination, cam means, cam follower means operated by said cam means, means to rotate continuously said cam means at a predetermined speed whereby said cam follower means is operated at predetermined time intervals and circuit controlling means operated by said cam follower means to close said circuit at predetermined time intervals, and means associated with said temperature responsive means to prevent operation of said cam follower means to a relay energizing position by said cam means when said circuit is closed by said temperature responsive means and for an appreciable period after opening of said circuit by said temperature responsive means.

19. In a control system, a motor, a relay adapted to operate said motor, a thermostat adapted to energize said relay, time controlled mechanism also adapted to energize said relay, said mechanism comprising revolvable cam means, means to revolve said cam means at a relatively constant speed, cam follower means operated by said cam means and means operated by said cam follower means to operate said relay upon operation of said cam follower means by said cam means, and means operated by said relay to prevent operation to a relay energizing position of said cam follower means by said cam means during energization of said relay by said thermostat, and to maintain said cam follower means inoperative for an appreciable period subsequent to opening of said circuit by said temperature responsive means.

20. In a control system, the combination of, a motor, means including a first circuit in control of said motor, control means for closing the first circuit to cause operation of said motor, a second circuit in control of said motor, periodically operated control means for periodically closing the second circuit to cause periodic operation of said motor including continuously operated cam means and means controlled by the means including the first circuit and directly and positively operated upon every closure of the first circuit to preclude closing of the second circuit for an appreciable period subsequent to opening of said first circuit.

21. In a control system, the combination of, a motor, means including a first circuit in control of said motor, control means for closing the first circuit to cause operation of said motor, a second circuit in control of said motor, periodically operated control means for periodically closing the second circuit to cause periodic operation of said motor including continuously operated cam means, means for adjusting the cam means to vary the duration of the period of operation of the motor, and means controlled by the means including the first circuit and positively operated upon every closure of the first circuit to preclude closing of the second circuit for an appreciable period subsequent to opening of the first circuit.

22. A stoker control system comprising, in combination, a plurality of circuits, condition responsive means to operate said stoker through one of said circuits, time controlled means to operate said stoker through another of said circuits, and means to prevent continued operation of said stoker through said circuit of said condition responsive means after original energization of said stoker through said circuit of said time controlled means in the absence of condition change sufficient to cause energization of the stoker by said condition responsive means, said means including a make and break contact in the circuit controlled by said condition responsive means, the arrangement being such that said contact is opened by said time controlled means prior to closing of said time controlled circuit and reclosed by said time controlled means subsequent to reopening of said time controlled circuit.

23. In a heating system for a space having heating means for the space and a stoker for firing the heating means, the combination of, a relay having a control winding, a maintaining switch and a load switch for the stoker, the maintaining switch and the load switch being closed when the control winding is energized, a space thermostat having a pair of switches that are sequentially closed upon a decrease in space temperature, means for completing a starting circuit through the control winding of the relay and the last to close switch of the thermostat to close the maintaining switch and the load switch for starting operation of the stoker, means for completing a maintaining circuit through the control winding of the relay, the first to close switch of the thermostat and the maintaining switch to maintain the load switch closed and the stoker in operation until the first to close switch of the thermostat is opened, a timer, a first switch periodically opened and closed by the timer, a normally closed second switch operated by the timer and maintained momentarily opened following opening of the first switch, and means for completing a circuit through the control winding of the relay and the periodically operated first switch to close periodically the maintaining switch and the load switch to operate periodically the stoker independently of the thermostat, said second timer operated switch being included in the maintaining circuit to prevent continued operation of the stoker following a timed operation when only the first to make switch of the thermostat is closed.

24. In apparatus of the character described, in combination, switch means, timing means for normally periodically causing closing and opening operation of the switch means, additional means for causing closing and opening operation of the switch means at indeterminate times, and mechanism comprising latch means controlled by both the additional means and timing means whereby normally after a closing and opening operation of the switch means caused by the additional means the timing means is rendered temporarily ineffective to cause closing and opening operation of the switch means and is then rendered effective again so that a longer than normal period elapses before another closing and opening operation of the switch means is caused by the timing means.

25. A device of the class described, comprising, in combination, a switch, means to open and close said switch and including cam means rotatable at a substantially constant speed and associated cam follower means to open and close said switch in accordance with a predetermined schedule, said means to open and close said switch also including an additional means for opening and closing said switch, and means associated with said cam means and said cam follower means and connected to said additional means for actuation thereby each time said additional means actuates said switch to prevent operation of said switch by said cam means and cam follower means at one of its scheduled times upon operation of said switch by said additional means during a predetermined different portion of said schedule.

26. In a timing mechanism of the class described, in combination, a device to be operated, timing means to move said device to a first position and then back to its original position according to a predetermined schedule and including rotatable cam means and associated cam follower means, additional means by which said device may be moved to its first position and then back to its original position at times differing from said predetermined schedule, and means associated with said timing means and connected to said additional means for direct actuation thereby by which operation of said device by said additional means during a predetermined part of said schedule when said device would not be operated by said timing means prevents operation of said device to said first position by said timing means at a different and later portion of said schedule.

27. In a timing mechanism of the class described, in combination, a device which it is desired to move from a first position to a second position and then back to its first position, constantly rotatable cam means and associated cam follower means for moving said device to said second position, maintaining it therein for a predetermined time and then returning it to said first position upon constant rotation of said cam means, adjusting means associated with said cam means and cam follower means for varying the length of time said device will be maintained in its second position without affecting the periodicity at which said device will be moved to said second position during constant rotation of said cam means and for independently varying the number of times said device will be moved to its second position during a given period of time without affecting the length of time said device will be maintained in said second position, additional means independent of said cam means by which said device can be moved to its second position while said cam means is being rotated, and means cooperating with said device normally to prevent its being moved to said second position by said cam means and cam follower means if said device has been moved to its second position and back to its first position at a predetermined time other than that caused by said cam means and cam follower means.

28. In a control system, the combination of, a motor, means including a first circuit in control of said motor, control means for closing the first circuit to cause operation of said motor, a second circuit in control of said motor, periodically operated control means including cam means moved at a constant speed for periodically closing the second circuit to cause a predetermined number of periodic operations of said motor upon a given movement of the cam means, means for adjusting the cam means to increase or decrease the number of periods of operation of the motor for a given movement of the cam means, a single means for adjusting the cam means to simultaneously vary the duration of all the periods of motor operation, and means controlled by the means including the first circuit and positively operated upon every closure of the first circuit to preclude closing of the second circuit for an appreciable period subsequent to opening of the first circuit.

29. In a control system, the combination of, a motor, means including a first circuit in control of said motor, control means for closing the first circuit to cause operation of said motor, a second circuit in control of said motor, periodically operated control means including cam means moved at a constant speed for periodically closing the second circuit to cause a predetermined number of periodic operations of said motor for a given movement of said cam means, means for adjusting said cam means to vary the number of periods of operation of said motor for a predetermined movement of said cam means while automatically maintaining the duration of all of said periods equal to each other, and means controlled by said means including the first circuit and positively operated upon every closure of said first circuit to preclude closing of the second circuit for an appreciable period subsequent to opening of said first circuit by said first mentioned control means.

30. A device of the character described, comprising, in combination, a circuit, means to close said circuit, additional means to close said circuit, said additional means including rotatable cam means having active and inactive surfaces and cam follower means adjacent thereto, the arrangement being such that engagement of said cam follower with said active surfaces closes said circuit, means to rotate said cam at a predetermined speed whereby said active surfaces engage said cam follower means at predetermined intervals, and means positively and directly actuated by said first mentioned means upon every operation thereof normally to preclude the next subsequent closing of said circuit by said additional means.

31. In a control system in combination, a motor, condition responsive means to energize said motor through a circuit, a maintaining circuit for said motor controlled by said condition responsive means, time controlled means to energize said motor through another circuit, and means to prevent continued energization of said motor through said maintaining circuit after original energization through the other of said circuits in the absence of condition change sufficient to cause said condition responsive means to initially energize said motor.

32. In a control system in combination, a motor, condition responsive means to energize said motor through a circuit, a maintaining circuit for said motor controlled by said condition responsive means, time controlled means to energize said motor through another circuit and means to prevent continued energization of said motor through said maintaining circuit after original energization by said last-mentioned circuit in the absence of condition change sufficient to cause said condition responsive means to assume motor energizing position.

33. A device of the character described, comprising in combination, motor actuating means, first means to energize said actuating means, second means to energize said actuating means, said second means including a revolvable cam having a high and a low surface and a pivoted cam follower adjacent thereto the arrangement being such that engagement of said cam follower with one of said surfaces energizes said actuating means, means to rotate continuously said cam at a predetermined speed whereby said one of said surfaces engages said cam follower at predetermined intervals to energize said actuating means at predetermined intervals and means positively and directly actuated by said first means upon every operation thereof to preclude energization of said actuating means by said second means for an appreciable period subsequent to termination of energization of said actuating means by said first means.

ELMER K. SCOGGIN.

REFERENCES CITED

The following references are of record in the file of this patent:

UNITED STATES PATENTS

| Number | Name | Date |
|---|---|---|
| 1,856,832 | Halvorson | May 3, 1932 |
| 2,107,472 | Denison | Feb. 8, 1938 |
| 2,141,024 | Staley | Dec. 20, 1938 |
| 1,386,698 | Garrison | Aug. 9, 1921 |
| Re. 19,164 | Teeple | May 15, 1934 |
| 2,055,641 | Young | Sept. 29, 1936 |
| Re. 21,350 | Miller | Feb. 13, 1940 |
| 1,925,781 | Taylor | Sept. 5, 1933 |
| 1,960,718 | Standifer et al. | May 29, 1934 |
| 1,965,761 | Bardes | July 10, 1934 |
| 1,973,128 | Teeple | Sept. 11, 1934 |
| 2,153,197 | McCabe | Apr. 4, 1939 |
| Re. 20,240 | Owens | Jan. 12, 1937 |